April 13, 1954 — D. A. CUSANO ET AL — 2,675,331
TRANSPARENT LUMINESCENT SCREEN
Filed Dec. 15, 1950
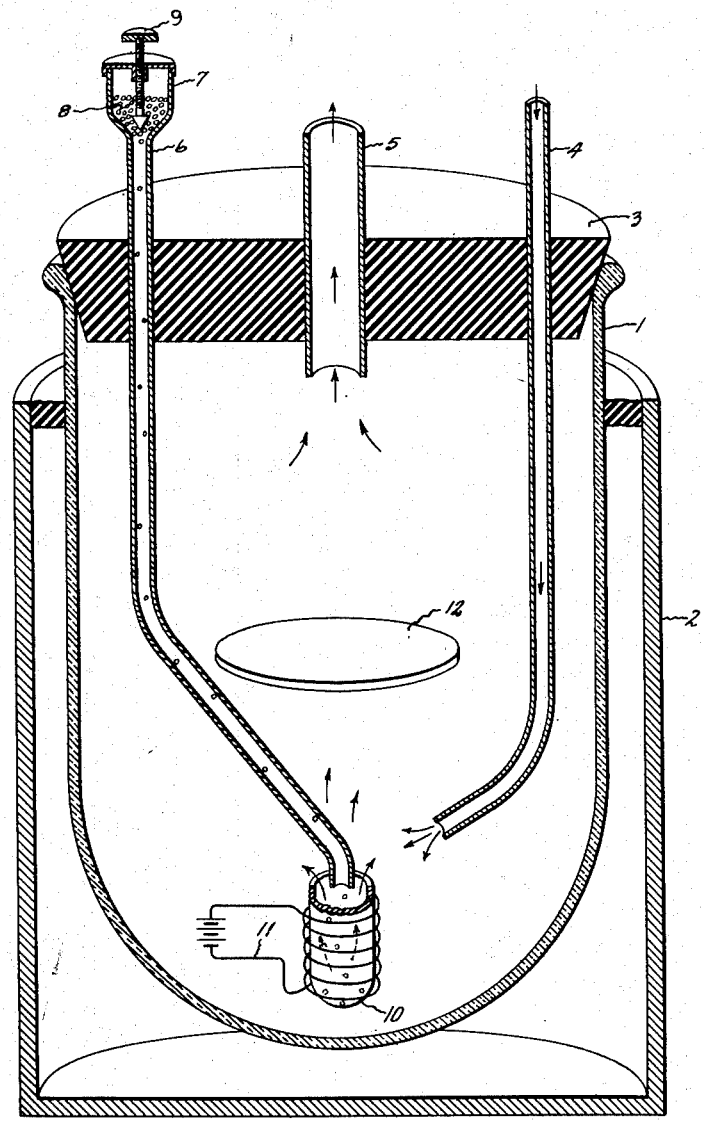
Inventors:
Dominic A. Cusano,
Frank J. Studer,
Paul A. Frank
by Their Attorney.

Patented Apr. 13, 1954

2,675,331

UNITED STATES PATENT OFFICE 2,675,331

TRANSPARENT LUMINESCENT SCREEN

Dominic A. Cusano and Frank J. Studer, Schenectady, N. Y., assignors to General Electric Company, a corporation of New York Application December 15, 1950, Serial No. 200,908

6 Claims. (Cl. 117—33.5)

This invention relates to luminescent screens. More particularly, it relates to luminescent screens which are in the form of a continuous, transparent film and the process of manufacture thereof.

Normally, luminescent screens such as those used in cathode ray tubes are formed directly on the glass viewing face and consist of fine grains or particles of luminescent material. Aside from the fact that such screens are difficult to make, they are subject to a number of deficiencies in actual use. While these deficiencies are present in all such cathode ray tube screens, they are particularly bothersome in the case of television viewing tubes.

One of the disadvantages of normal powder base luminescent screens is their tendency toward halation under excitation. When a cathode ray or electron beam strikes the phosphor or luminescent layer, a certain amount of the energy excited proceeds directly through the viewing face to the eye of the observer. However, some of the light is diffusely scattered by the phosphor particles within the screen to illuminate adjacent unexcited particles. Some of the light produced in the screen is also reflected at various angles from the near and far surfaces of the glass viewing face back into the screen to illuminate unexcited areas. The net result is a halo around the excited spot in the screen which detracts from the resolution and contrast of the image produced.

Added to the above effect is that produced by light outside the tube, since under normal circumstances it is not kept in complete darkness. Outside light incident on the tube passes through the viewing face to the luminescent particles and is scattered among them as well as back through the viewing face, a portion of the latter light being reflected back into the phosphor layer from the surfaces of the face plate. The net result of the above phenomena is a general gray appearance of the screen even before any excitation and a diminution of the contrast and definition of any image produced under excitation. The darkest parts of the image can never be any darker than the general gray cast resulting from the light scattering, and the effect is similar to that which obtains when a lantern slide image is projected onto an already illuminated screen.

The importance of the problem of scattered light in cathode ray tube screens is manifested by the means which are utilized to reduce its effect by even a small fraction. One such means consists in making the tube face plate or viewing face of darkened glass which absorbs some thirty per cent of the light normally passing through the face. While there is a diminution of the scattered light effect, there is a corresponding decrease in brightness. Another method of reducing the scattered light effect involves the admixture of inert black powders with the luminescent material of the screen. While the black particles are useful in blocking off some scattered light rays, again they detract from the brightness of the image produced.

An object of this invention is to provide luminescent screens which are characterized by negligible halation and light scattering effects.

Another object of this invention is to provide luminescent screens which are continuous rather than particulate in nature.

A further object of the invention is to provide useful luminescent screens which are in the form of continuous, transparent films.

Other objects will become apparent and the invention better understood from a consideration of the following description and the drawing in which the single figure shows a typical apparatus for forming luminescent screens of this invention.

It has been found that useful, continuous, film-like, transparent, luminescent screens characterized by decreased halation may be very readily fabricated.

More particularly, it has been found that such useful screens may be prepared by reacting in the vapor phase such materials as zinc, cadmium, or mixtures of these materials or the halides thereof with hydrogen sulfide or selenide in the presence of an activator.

The new, transparent, luminescent screens are to be distinguished from the manganese activated zinc fluoride screen described by F. E. Williams, "Journal of the American Optical Society," 37, 4, 306 (1947). While this zinc fluoride screen luminesced under cathode ray bombardment, it exhibited a marked tendency to burn and lost its efficiency under sustained cathode ray bombardment such as is experienced, for example, in a cathode ray tube. On the other hand, the screens of the present invention maintain their brightness and efficiency under continuous cathode ray bombardment as well as under 3650 Å., 2537 Å., and other excitation. The new screens are also to be distinguished from thick screens which are cast from fused material.

The apparatus for carrying out the present invention may be varied in structure a typical design or arrangement being shown in the drawing.

The treating chamber 1 is surrounded by or placed in a furnace 2 heated by a source not shown. Alternatively the chamber 1 may be wrapped with resistance heating wire or other means utilized to heat it to the desired temperature, such means being well known in the art. The upper open end of chamber 1 is sealed with a stopper or plug 3 having holes therein for the passage of gas supply tube 4, evacuation tube 5, and solid material introducing tube or conduit 6. Conduit 6 has a compartment 7 for the storage of material 8 at its upper end as well as a valve device 9 to control the flow of the material down the tube. Toward the lower end of chamber 1 is located a receptacle or container 10 to receive material from conduit 6. Container 10, as well as other exposed parts, is typically of alundum, quartz, or other material which will not react with the materials used. In order that the material or materials in container 10 may be vaporized, the latter is heated externally as by electrical resistance wire 11. The plate or other surface 12 to be coated is placed above container 10 and the lower end of tube 4.

In operation the furnace 2 or other heating means for the chamber 1 is energized to raise the temperature of plate 12 to from about 400° C. to 600° C. and preferably from 550° C. to 600° C. Container 10 is heated to above the vaporizing temperature of the substance used and valve 9 opened to allow material 8 to drop by gravity into container 10 where it is vaporized and rises upward. At the same time a gas, either hydrogen sulfide or hydrogen selenide, is introduced through tube 4, the lower end of which is so located, as shown, that the gas intermingles and mixes with the vapors of the material 8 and reacts therewith to form on the plate 12 a condensed, continuous, transparent, luminescent film. The chamber is continually evacuated through tube 5. A particular advantage of the above-described method of feeding the solid material into container 10 during the reaction is that, in a mixture of two or more materials, one of which may be more volatile than the other, the vapors above the container reacting with the gas from tube 4 will always contain some of each material. This is to be contrasted to the situation where the entire charge of solid material is placed in a container and heated, in which case the more volatile material escapes first making the outer part of the film deficient in that material.

While the above-described apparatus is the preferred embodiment of that used in carrying out the present invention, it will be realized, of course, that the process may be practiced utilizing apparatus which is varied in different respects by those skilled in the art and which does not detract appreciably from the quality and characteristics of the final structure produced thereby. The methods of making such transparent luminescent screens form a portion of the subject matter covered by our patent application, Serial No. 302,224, filed on August 1, 1952, as a continuation-in-part of the present application and assigned to the same assignee.

The following examples are presented as illustrations of the practice of the invention.

Zinc chloride is introduced into container 10 which is maintained at a temperature of over 732° C., the boiling point of zinc chloride, in order to drive off vapors of the material. The glass plate or other surface to be coated corresponding to plate 12 of the drawing is heated to a temperature of 400° C. to 600° C. and preferably from 550° C. to 600° C. At the same time a stream of hydrogen sulfide is introduced into the treating chamber as through conduit 4, the chamber being evacuated through conduit 5. As the vapors of the zinc chloride rise upward toward the plate to be coated, they intermingle with the hydrogen sulfide and react therewith, producing on the plate a continuous, transparent film which upon analysis is shown to be ZnS:Zn. The film is made in any thickness desired simply by varying the time of treatment. (In actual use films having a thickness of from $.5\mu$ to $1\mu$ have been found most useful, though there is no limit in this respect.) The film luminesces efficiently under cathode ray, and to some extent under 3650 Å. and 2537 Å. excitation.

Zinc sulfide luminescent material containing other activators may be prepared in a similar manner. For example, if a copper activated zinc sulfide is desired copper chloride or another copper compound such as copper sulfate is mixed with zinc chloride and the mixture heated to vaporization, the zinc chloride and hydrogen sulfide reacting to form a luminescent, transparent, zinc sulfide film activated with copper. Alternatively, the activator may be vaporized in a separate heated container.

A large number of activators including manganese, silver, copper, zinc, and aluminum, among others, are capable of being incorporated in the zinc, cadmium, and zinc-cadmium sulfide and selenide systems to yield transparent, luminescent deposits or films. The activating materials are introduced in the form of the elements themselves or their salts.

In addition to zinc chloride, zinc bromide is suitable as a starting material with the same activators, the final phosphor having the same composition as above.

Another alternative method of preparing the new phosphors is to vaporize zinc metal as such in lieu of the halide along with the desired separate activator or alone, and react the composite vapor with $H_2S$ to produce the activated sulfide which is deposited on the glass plate or other non-corrosive base material.

Cadmium sulfide phosphors are prepared in the same manner as those of zinc, the only deviation being to adjust the temperature of the vaporizing receptacle to such degree as will evaporate the particular substance employed. Activators conveniently used with cadmium sulfide are copper, silver, manganese, and aluminum.

As illustrative of the preparation of the cadmium sulfide phosphor, cadmium chloride is vaporized, its vapor mixed with those of hydrogen sulfide and the CdS:Cd reaction product allowed to deposit on a glass or other plate held at 400° C. to 600° C. and preferably at from 550° C. to 600° C.

Likewise, cadmium chloride or bromide and a salt of an activating material, or the element itself, such as those listed above are vaporized in admixture or separately, allowed to react with hydrogen sulfide and to deposit on a base plate held at temperatures as above. Similarly, cadmium metal may be used in lieu of the salt.

Zinc-cadmium sulfide phosphors are prepared in the same manner as the zinc and cadmium sulfides, the zinc and cadmium containing raw materials being mixed in desired proportions.

When hydrogen selenide is utilized instead of hydrogen sulfide, a series of selenide phosphors is obtained, no other raw material or processing conditions being altered. In every case the final product is in the form of a transparent and continuous film which luminesces under cathode ray as well as to some extent under 3650 Å and 2537° Å excitation.

It is to be understood, of course, that the pure metals and salts of metals disclosed herein may be used in admixture in preparing the new luminescent screens.

It will be seen that by the present invention, there are provided activated zinc, cadmium, and zinc-cadmium sulfide and selenide luminescent materials which may be obtained in the form of continuous, transparent films. These luminescent films are further activated with various material to obtain different colored emissions as above. By blending discrete films of various colors or by preparing a single film with a selection of activators, all colors, as well as white emission, may be attained.

The present transparent, luminescent films, as pointed out above, are particularly characterized by a lack of the halation effect and light scattering encountered in the use of particulate luminescent screens. When the present screens are excited, the absence of the halo effect and light scattering makes possible greater contrast between excited and unexcited areas. The new transparent screens are further characterized by the absence of background illumination such as occurs when room light incident upon an ordinary screen is scattered among the particles thereof.

While the above luminescent screens are particularly useful in television receiver cathode ray tubes, they have utility in any case where high contrast and fidelity are required in images produced on a luminescent screen. They are of great value in the study of electron penetration and scattering effects.

What we claim as new and desire to secure by Letters Patent of the United States is:

1. A luminescent screen in the form of a glass base plate, and a transparent film overlying said base plate, said film consisting of an activated material selected from the class consisting of the sulfide and selenide of a material selected from the class consisting of zinc, cadmium, and mixtures thereof, said activated material having been produced by a vapor phase reaction immediately before deposition upon said base plate.

2. A luminescent screen as claimed in claim 1 with the transparent film consisting of activated zinc sulfide.

3. A luminescent screen as claimed in claim 1 with the transparent film consisting of activated cadmium sulfide.

4. A luminescent screen as claimed in claim 1 with the transparent film consisting of activated zinc-cadmium sulfide.

5. A luminescent screen as claimed in claim 1 with the transparent film consisting of activated zinc selenide.

6. A luminescent screen as claimed in claim 1 with the transparent film consisting of activated zinc-cadmium selenide.

References Cited in the file of this patent

UNITED STATES PATENTS

| Number | Name | Date |
| --- | --- | --- |
| 1,110,563 | Hewitt | Sept. 15, 1914 |
| 2,161,458 | Boer et al. | June 6, 1939 |
| 2,280,939 | Weinhart | Apr. 28, 1942 |
| 2,402,900 | Koller | June 25, 1946 |
| 2,462,517 | Leverenz | Feb. 22, 1949 |
| 2,498,592 | Switzer | Feb. 21, 1950 |
| 2,536,586 | Waye et al. | Jan. 2, 1951 |
| 2,600,579 | Ruedy et al. | June 17, 1952 |